US010376907B2

(12) United States Patent
Baxter et al.

(10) Patent No.: US 10,376,907 B2
(45) Date of Patent: Aug. 13, 2019

(54) DROPLET GENERATING ROTATING CUTTERS

(71) Applicants: Larry Baxter, Orem, UT (US); Aaron Sayre, Spanish Fork, UT (US); David Frankman, Provo, UT (US); Nathan Davis, Bountiful, UT (US)

(72) Inventors: Larry Baxter, Orem, UT (US); Aaron Sayre, Spanish Fork, UT (US); David Frankman, Provo, UT (US); Nathan Davis, Bountiful, UT (US)

(73) Assignee: Sustainable Energy Solutions, LLC, Orem, UT (US)

( * ) Notice: Subject to any disclaimer, the term of this patent is extended or adjusted under 35 U.S.C. 154(b) by 179 days.

(21) Appl. No.: 15/694,147

(22) Filed: Sep. 1, 2017

(65) Prior Publication Data

US 2019/0070619 A1 Mar. 7, 2019

(51) Int. Cl.

| | |
|---|---|
| ***B01F 3/04*** | (2006.01) |
| ***B01D 47/16*** | (2006.01) |
| ***B05B 3/04*** | (2006.01) |
| ***B05B 1/02*** | (2006.01) |

(52) U.S. Cl.
CPC ............ *B05B 3/0422* (2013.01); *B01D 47/16* (2013.01); *B01F 3/04028* (2013.01); *B01F 3/04078* (2013.01); *B01F 3/04468* (2013.01); *B05B 1/02* (2013.01)

(58) Field of Classification Search
CPC .... B01F 3/04; B01F 3/04078; B01F 3/04068; B01D 47/00; B01D 47/16
USPC .......................................................... 261/118
See application file for complete search history.

(56) References Cited

U.S. PATENT DOCUMENTS 3,369,800 A * 2/1968 Nakai ...................... B01D 3/30 261/88

* cited by examiner

*Primary Examiner* — Robert A Hopkins

(57) ABSTRACT

A device for producing droplets is disclosed. A disk assembly comprising a first disk mounted to a second disk is provided. The first disk comprises first openings. The second disk comprises second openings. The first openings and the second openings alternately align with one another such that, as a liquid passes through the first openings and the second openings, the liquid falls as a droplet as the first openings and the second openings skew apart.

18 Claims, 11 Drawing Sheets

DROPLET GENERATING ROTATING CUTTERS

This invention was made with government support under DE-FE0028697 awarded by The Department of Energy. The government has certain rights in the invention.

FIELD OF THE INVENTION

This invention relates generally to production of droplets of liquid. More particularly, we are interested in a droplet generating rotating cutter.

BACKGROUND

The production of droplets of liquids, both pure liquids and slurries, is of great interesting in various industries. Droplets are used to contact the liquid with a gas and can be used in reactors, heat and material exchangers, and other applications. In cases where viscous liquids and slurries are involved, most droplet generation methods, including drip trays and nozzles, do not produce droplets that maximize surface area contact with gases. Droplet generating devices are required that can produce droplets out of fluids of any viscosity.

U.S. Pat. No. 3,532,271, to Polnauer, teaches spray nozzles with spiral flow fluid. The present disclosure differs from this disclosure in that the disclosure produces droplets using a nozzle, not by passing a liquid through parallel disks. This disclosure is pertinent and may benefit from the devices disclosed herein and is hereby incorporated by reference in its entirety for all that it teaches.

U.S. Pat. No. 4,327,050, to Salmon, teaches an extrusion and pelleting apparatus and method. The plastics are passed through a plate with openings and the pellets of plastic are cut off by rotating blades. The present disclosure differs from this disclosure in that the disclosure does not have two plates or discs, both of which have openings through which the fluid passes. This disclosure is pertinent and may benefit from the devices disclosed herein and is hereby incorporated by reference in its entirety for all that it teaches.

SUMMARY

A device for producing droplets is disclosed. A disk assembly comprising a first disk mounted to a second disk is provided. The first disk comprises a plurality of first openings. The second disk comprises a plurality of second openings. The plurality of first openings and the plurality of second openings alternately align with one another such that, as a liquid passes through the plurality of first openings and the plurality of second openings, the liquid falls as a droplet as the plurality of first openings and the plurality of second openings skew apart.

The first disk and the second disk may comprise metals, plastics, ceramics, or combinations thereof.

The liquid may comprise a slurry or a pure liquid. The liquid may comprise a viscosity greater than water.

An interior, bottom portion of the plurality of first openings, an interior, top portion of the plurality of second openings, or a combination thereof, may comprise sharpened edges. The first disk may comprise needle-shaped protrusions attached to an edge of the plurality of first openings.

The first disk and the second disk may be installed in a vessel. The vessel may comprise a liquid inlet above the first disk, a gas-liquid contacting space, a liquid outlet below the gas-liquid contacting space, a gas inlet above the liquid outlet and below the gas-liquid contacting space, and a gas outlet below the second disk. The first disk, the second disk, or the first disk and the second disk may be caused to rotate by one or more friction drives. The first disk may be caused to rotate by a driven shaft attached to a center of the first disk, the second disk may be caused to rotate by a driven shaft attached to a center of the second disk, or a combination thereof. The first disk and the second disk may be sealed by gaskets or O-rings at inside edges of the vessel.

The first disk and the second disk may comprise identical opening patterns. The first disk and the second disk may comprise identical but mirrored opening patterns. The plurality of first openings may be divergent from each other, the plurality of second openings may be divergent from each other, or a combination thereof. The plurality of first openings may be divergent from any line made between a center and an outer edge of the first disk, the plurality of second openings may be divergent from any line made between a center and an outer edge of the second disk, or a combination thereof. The plurality of first openings may be antisymmetric about a center of the first disk, the plurality of second openings may be antisymmetric about a center of the second disk, or a combination thereof. The first disk and the second disk may comprise identical thicknesses. The first disk and the second disk may comprise different thicknesses. The first disk may be stationary and the second disk may be driven by gears that are driven by a turbine that may be driven by the fluid passing through the fluid inlet.

The disk assembly may be installed in a vessel. The vessel may comprise a liquid inlet above the first disk, a gas-liquid contacting space, a liquid outlet below the gas-liquid contacting space, a gas inlet above the liquid outlet and below the gas-liquid contacting space, and a gas outlet below the second disk. A contact liquid may pass through the liquid inlet and a carrier gas may pass through the gas inlet. The plurality of first openings and the plurality of second openings alternately align with one another such that, as the liquid passes through the plurality of first openings and the plurality of second openings, the liquid falls as a droplet as the plurality of first openings and the plurality of second openings skew apart. The droplet may fall through the carrier gas, exchanging heat, material, or heat and material. The gas may pass out the gas outlet and the liquid passes out the liquid outlet.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Figure 1A:
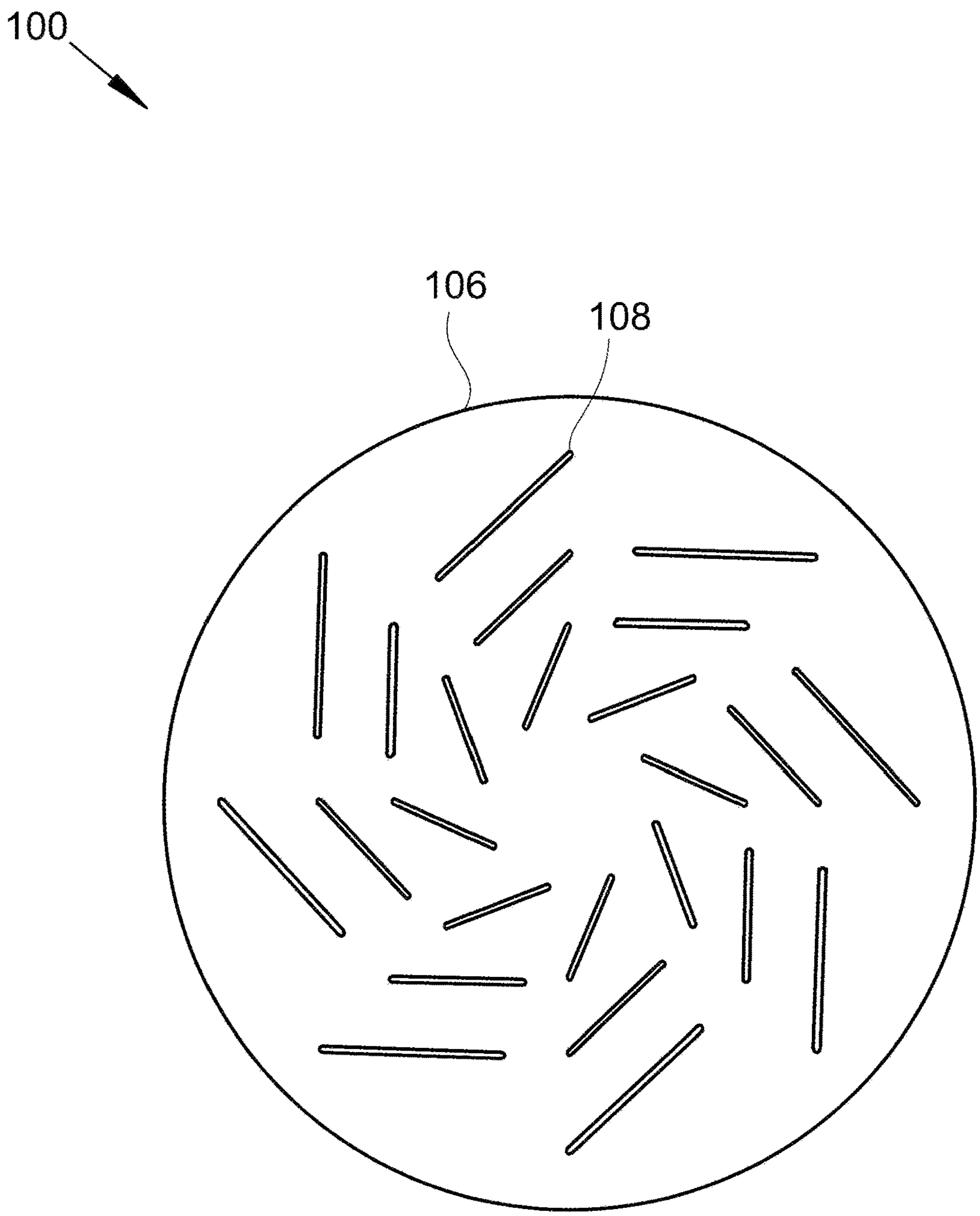
FIG. 1A shows a face view of a first disk with slit openings.
Figure 1B:
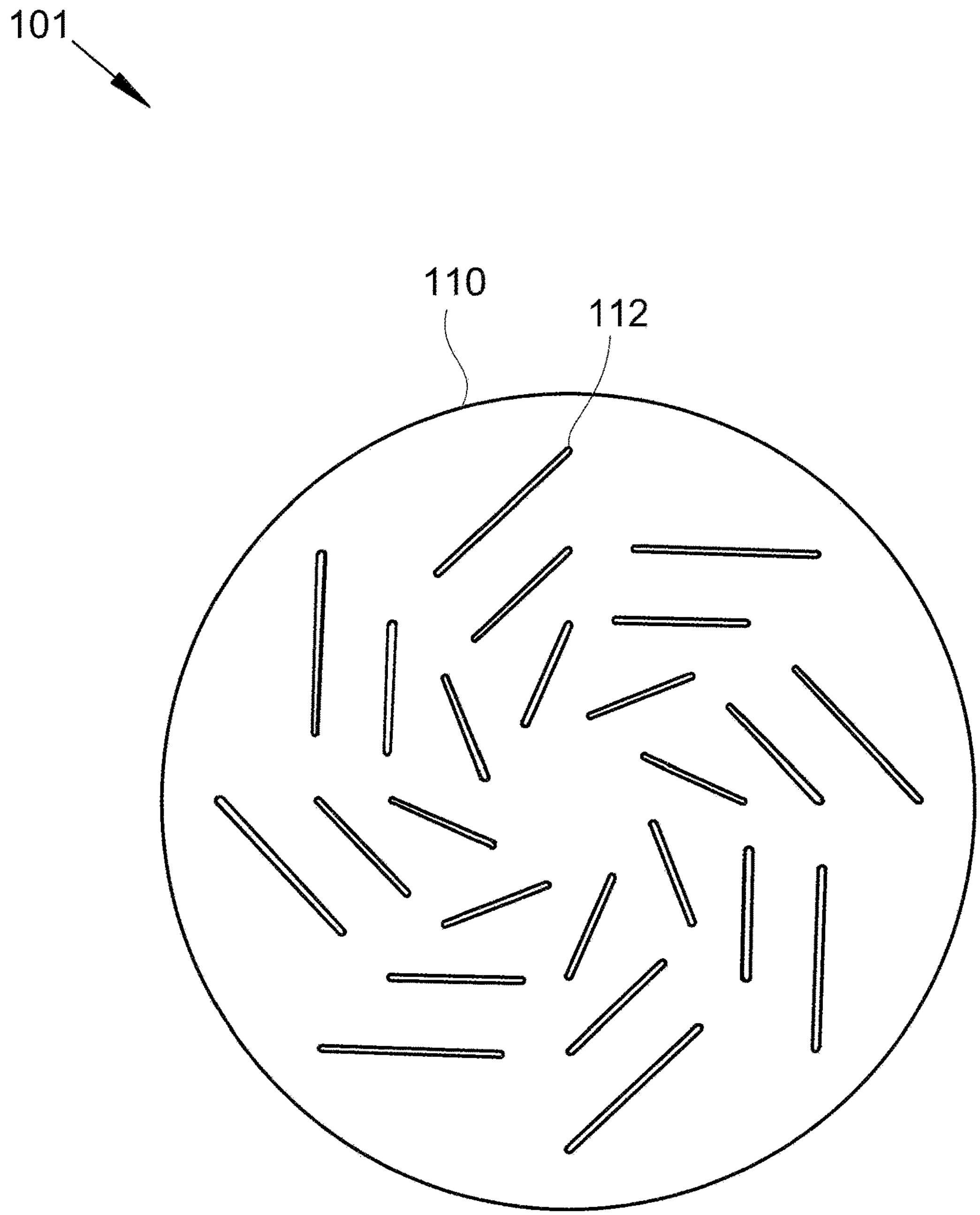
FIG. 1B shows a face view of a second disk with slit openings.
Figure 1C:
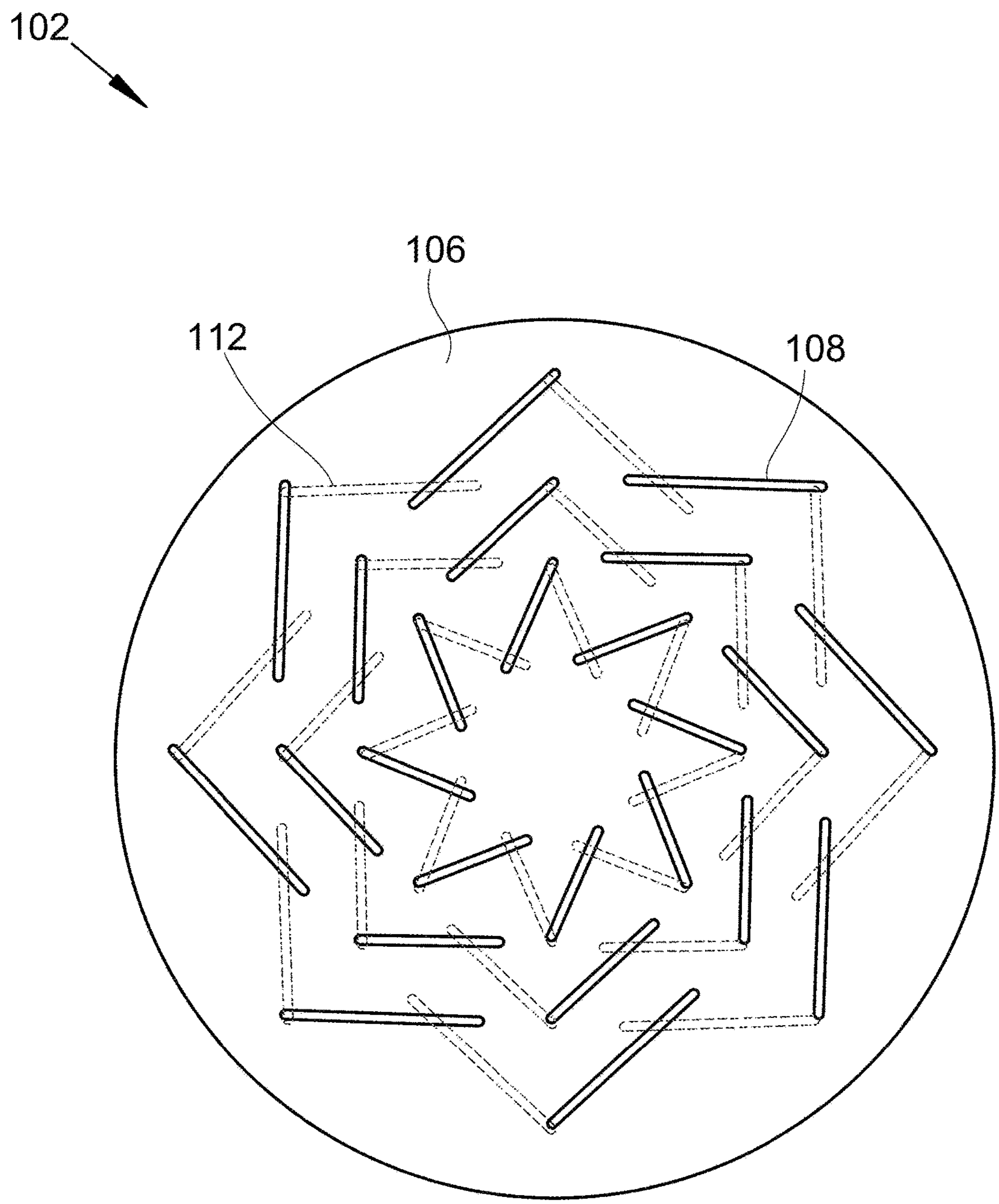
FIG. 1C shows a face view of the first disk in front of the second disk.
Figure 1D:
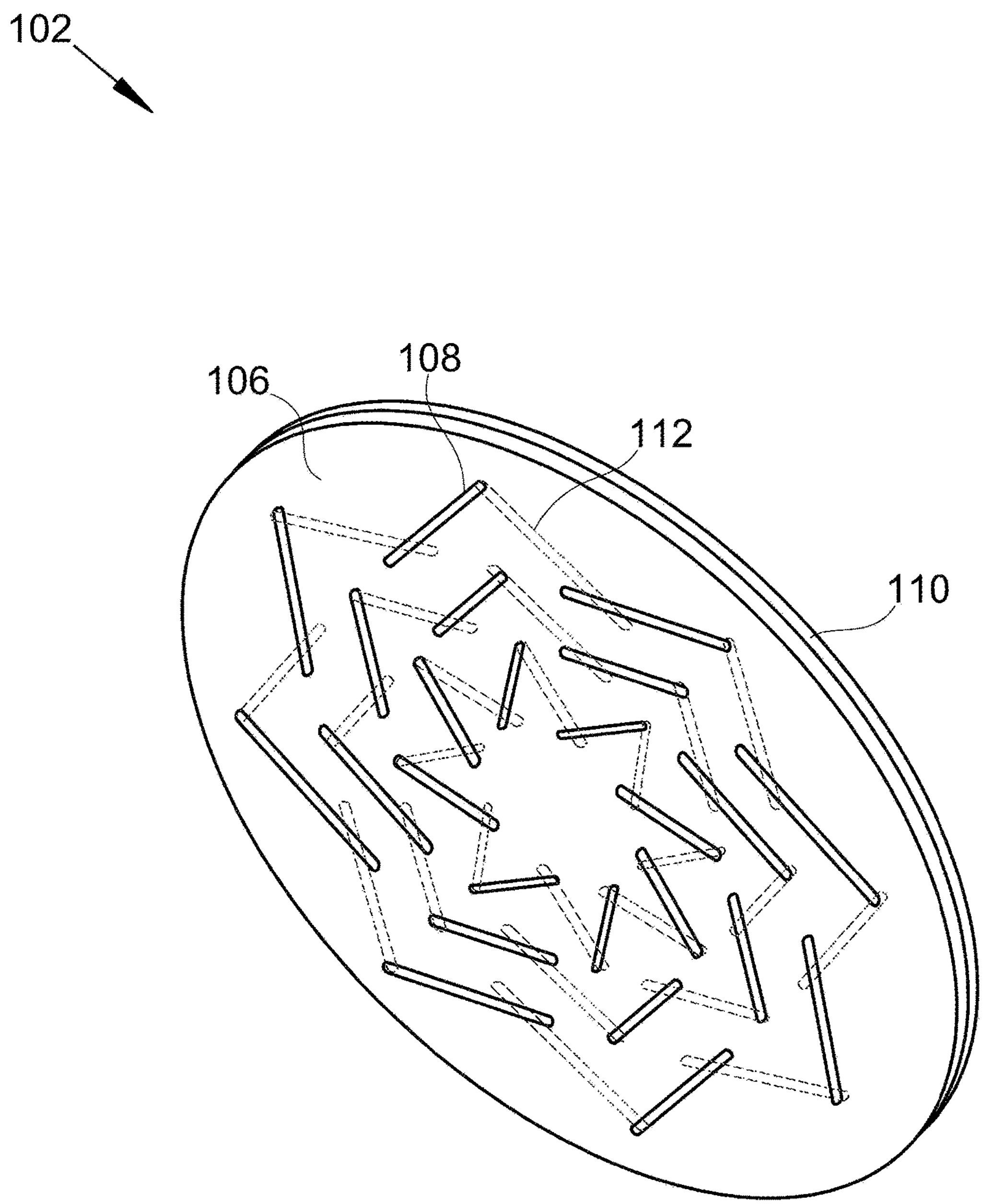
FIG. 1D shows an isometric view of the first disk and second disk of FIG. 1C.

Referring to FIGS. 1A-D, various views of a disk assembly are shown at 100-103, as per one embodiment of the present invention. FIG. 1A shows a face view of a first disk with slit openings at 100. FIG. 1B shows a face view of a second disk with slit openings at 101. FIG. 1C shows a face view of the first disk in front of the second disk at 102. FIG. 1D shows an isometric view of the first disk and second disk of FIG. 1C at 103. The disk assembly comprises first disk 106 mounted to second disk 110. First disk 106 comprises first slit openings 108. Second disk 110 comprises second slit openings 112. First slit openings 108 and second slit openings 112 alternately align with one another such that, as a liquid passes through first slit openings 108 and second slit openings 112, the liquid falls as a droplet as first slit openings 108 and second slit openings 112 skew apart. The term skew apart can also be understood to mean rotating the openings away from each other.

Figure 2A:
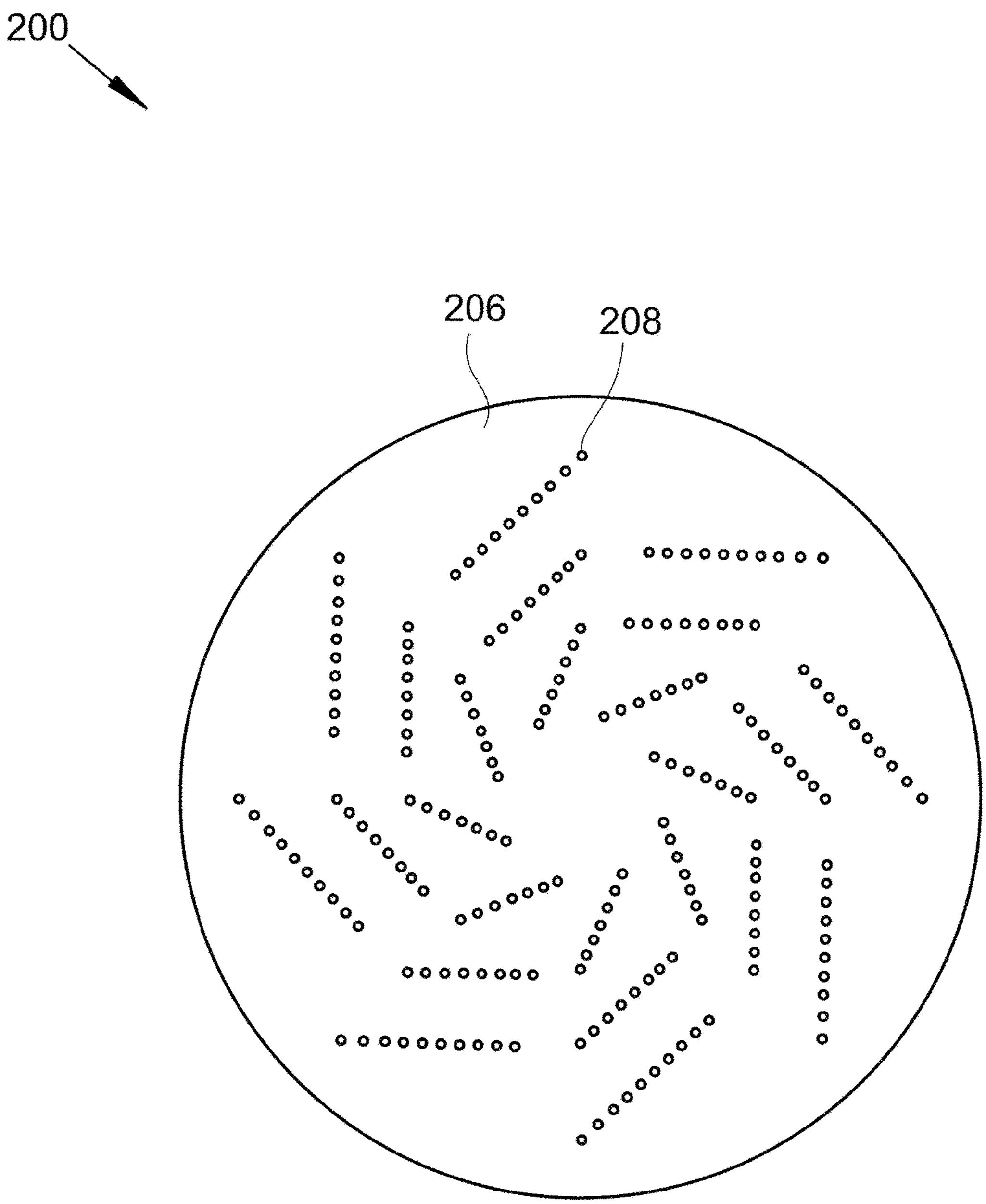
FIG. 2A shows a face view of a first disk with round openings.
Figure 2B:
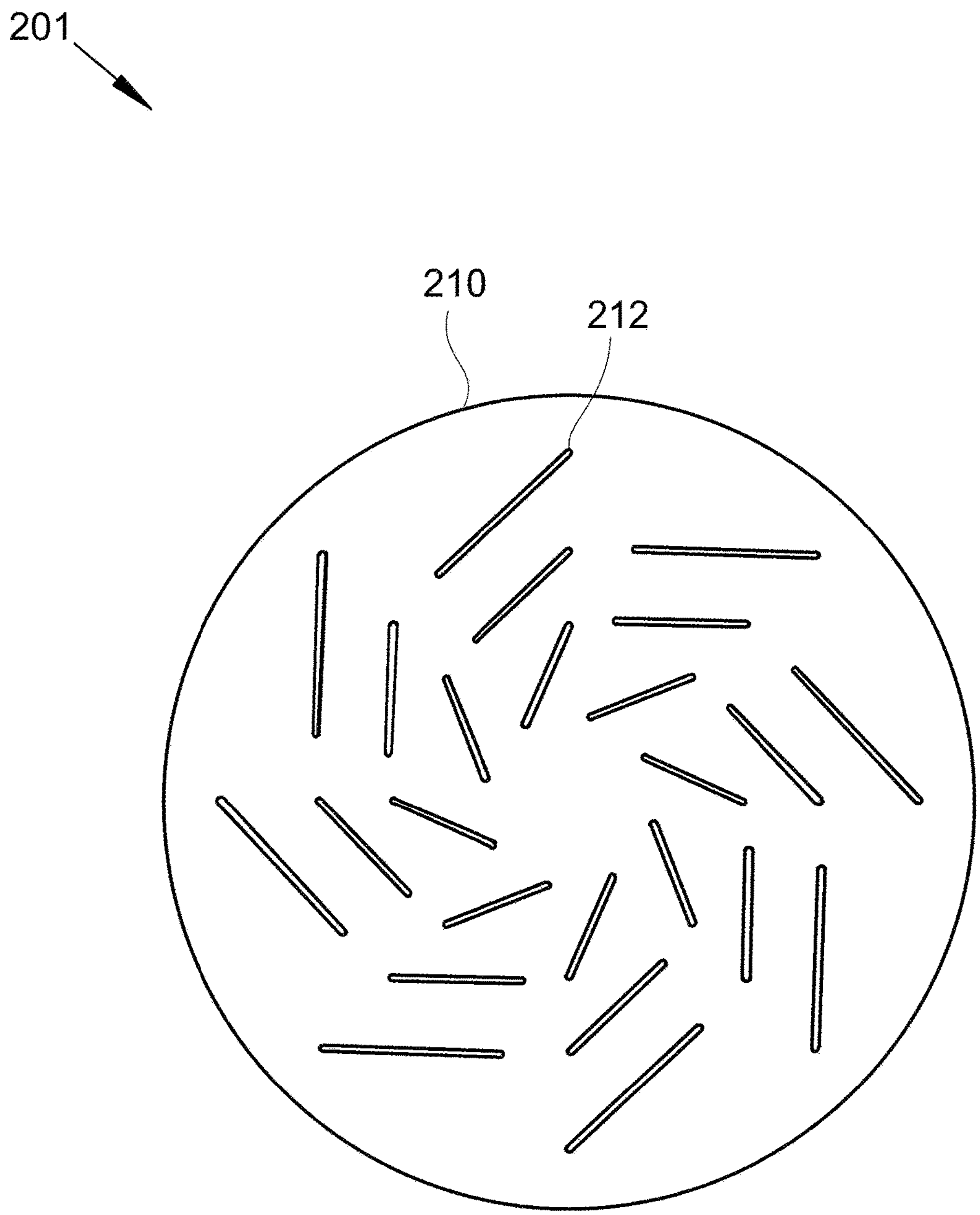
FIG. 2B shows a face view of a second disk with slit openings.
Figure 2C:
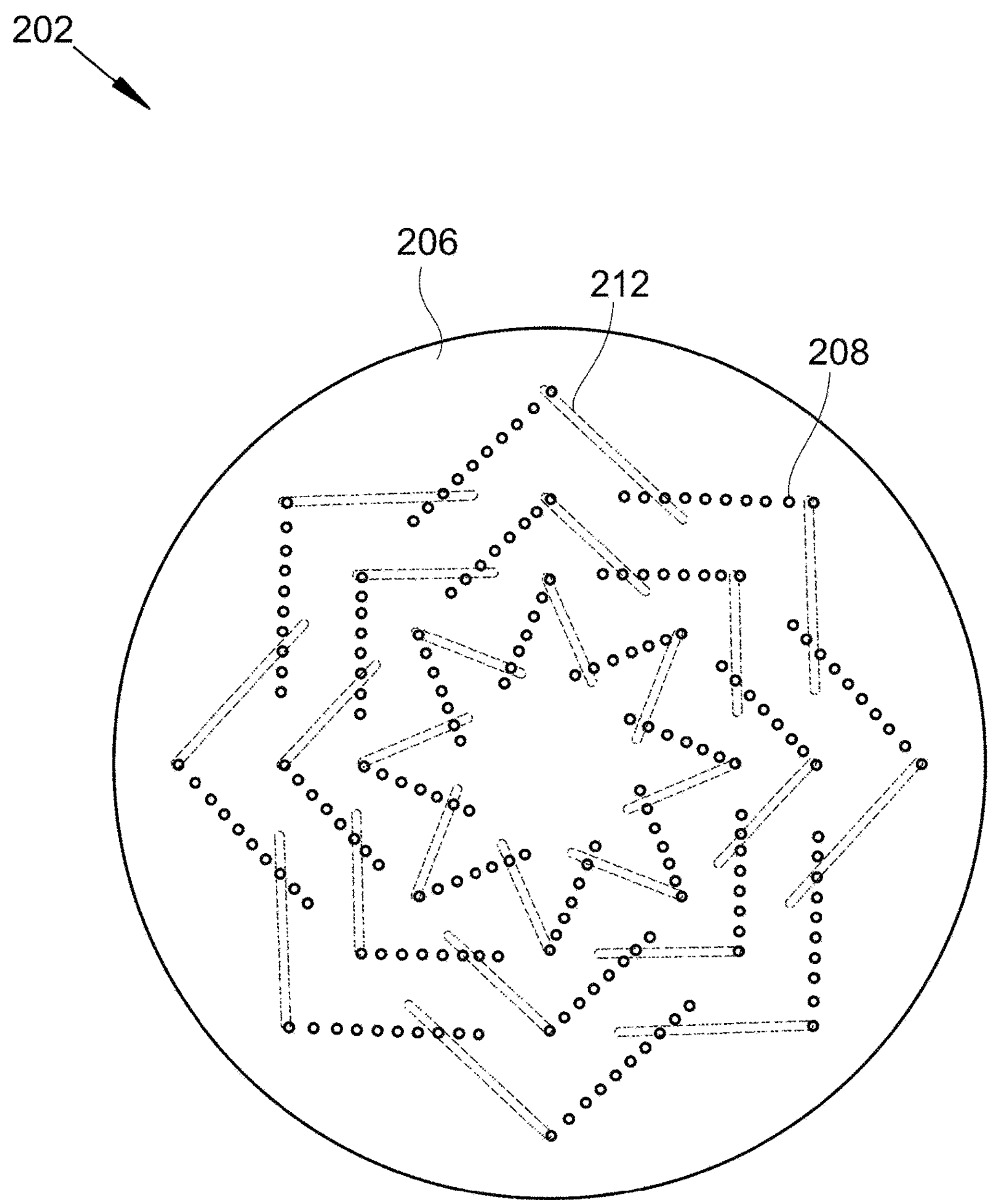
FIG. 2C shows a face view of the first disk in front of the second disk.
Figure 2D:
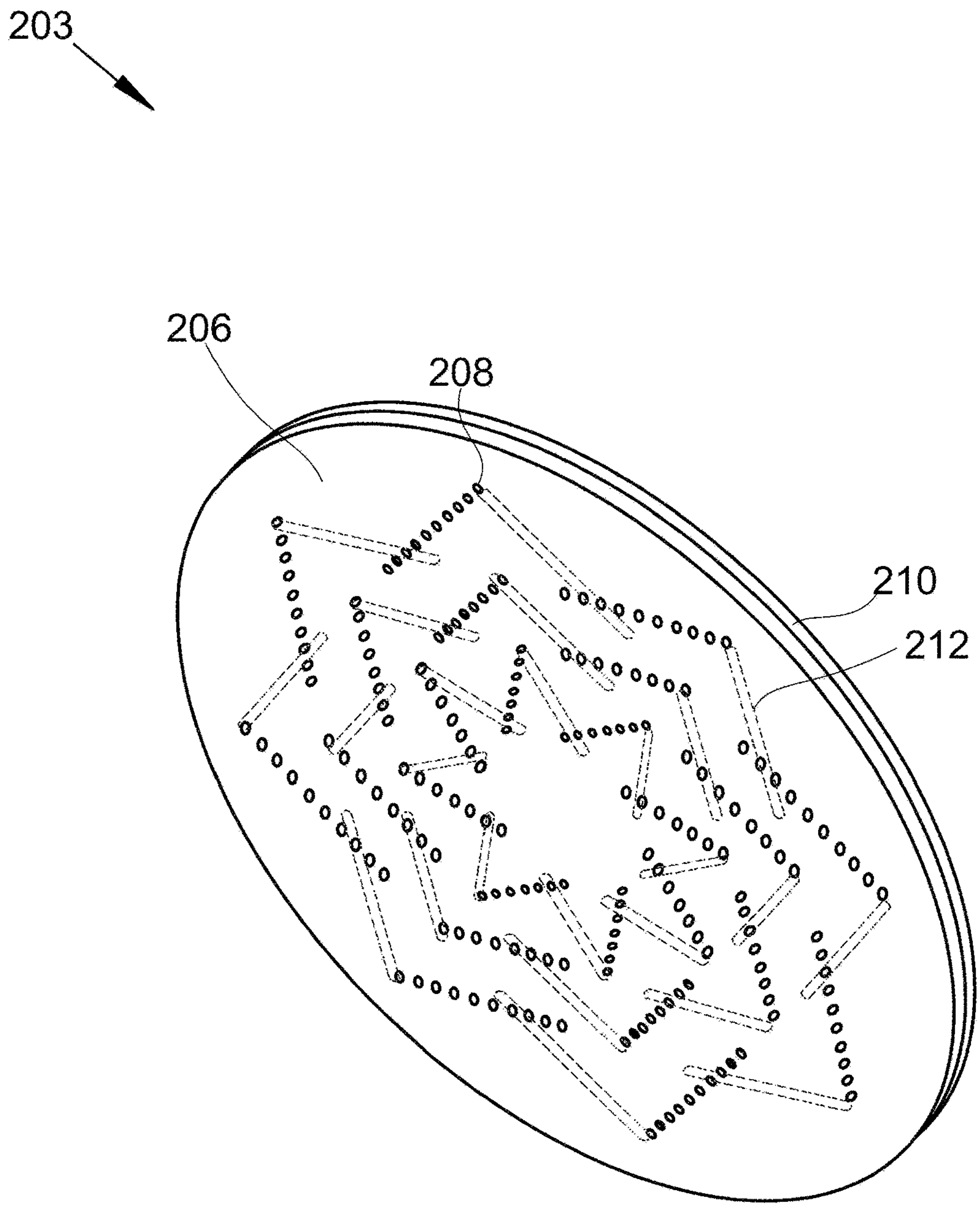
FIG. 2D shows an isometric view of the first disk and second disk of FIG. 1C.

Referring to FIGS. 2A-D, various views of a disk assembly are shown at 200-203, as per one embodiment of the present invention. FIG. 2A shows a face view of a first disk with round openings at 200. FIG. 2B shows a face view of a second disk with slit openings at 201. FIG. 2C shows a face view of the first disk in front of the second disk at 202. FIG. 2D shows an isometric view of the first disk and second disk of FIG. 2C at 203. The disk assembly comprises first disk 206 mounted to second disk 210. First disk 206 comprises hole openings 208. Second disk 210 comprises slit openings 212. Hole openings 208 and slit openings 212 alternately align with one another such that, as a liquid passes through hole openings 208 and slit openings 212, the liquid falls as a droplet as hole openings 208 and slit openings 212 skew apart. The term skew apart can also be understood to mean rotating the openings away from each other.

Figure 3:
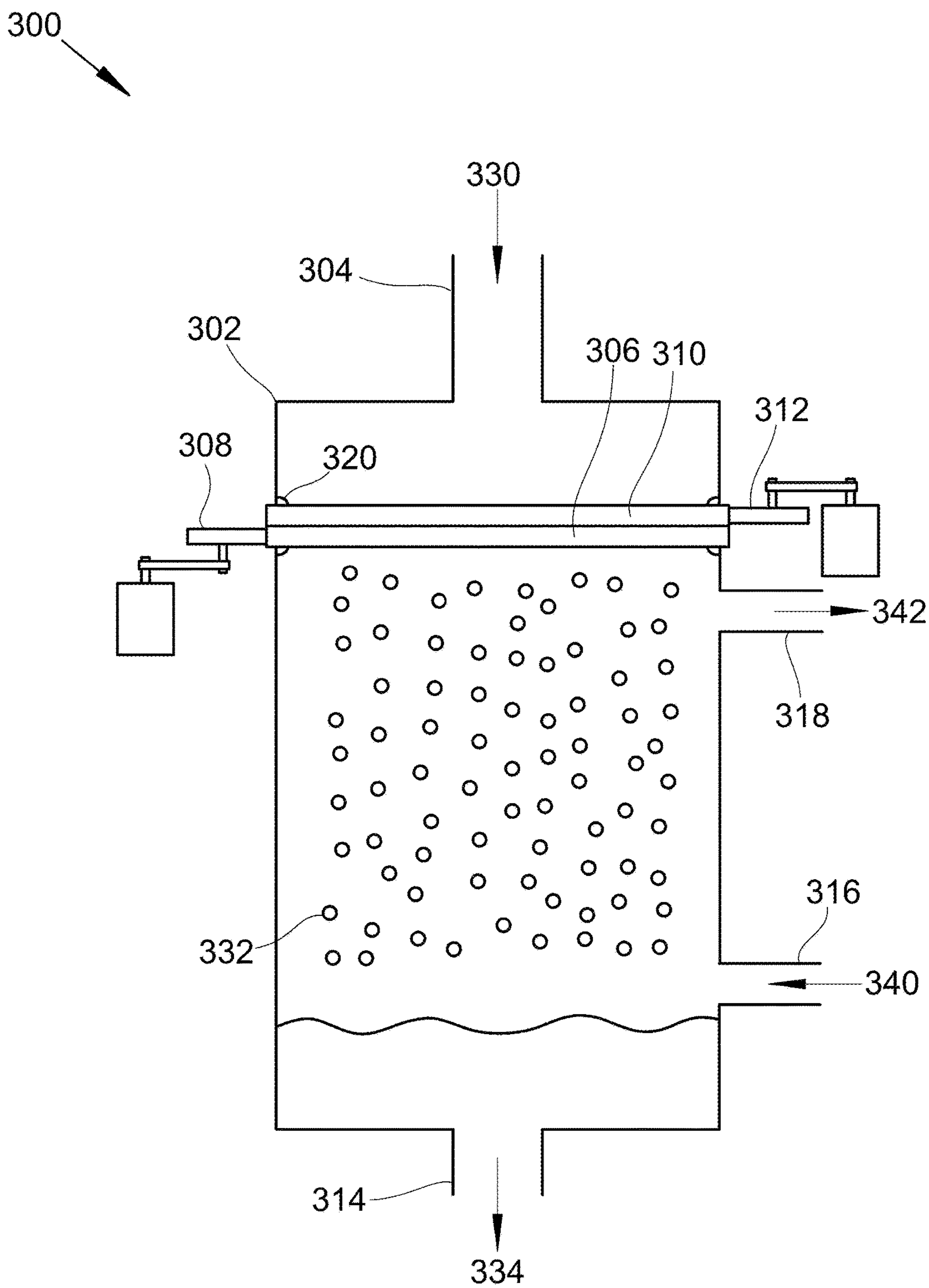
FIG. 3 shows a vessel with the disk assembly of FIG. 1C or FIG. 2C.

Referring to FIG. 3, a vessel with the disk assembly of FIG. 1C or FIG. 2C is shown at 300, as per one embodiment of the present invention. Vessel 302 comprises liquid inlet 304, liquid outlet 314, gas inlet 316, gas outlet 318, first disk 306, second disk 310, and seals 320. First disk 306 is rotated by first friction drive 308. Second disk 310 is rotated in an opposite direction by second friction drive 312. Liquid 330 passes through liquid inlet 304. Carrier gas 340 passes through gas inlet 316. The first openings and the second openings alternately align with one another such that, as contact liquid 330 passes through the first openings and the second openings, contact liquid 330 falls as droplet 332 as the first openings and the second openings skew apart. Droplet 332 falls through carrier gas 340, exchanging heat, material, or heat and material. Carrier gas 342 passes out gas outlet 318 and contact liquid 334 passes out the liquid outlet. Seals 320 prevent liquid 330 and gas 340 from leaking through any gap between the edges of vessel 302 and first disk 306 or second disk 310.

Figure 4:
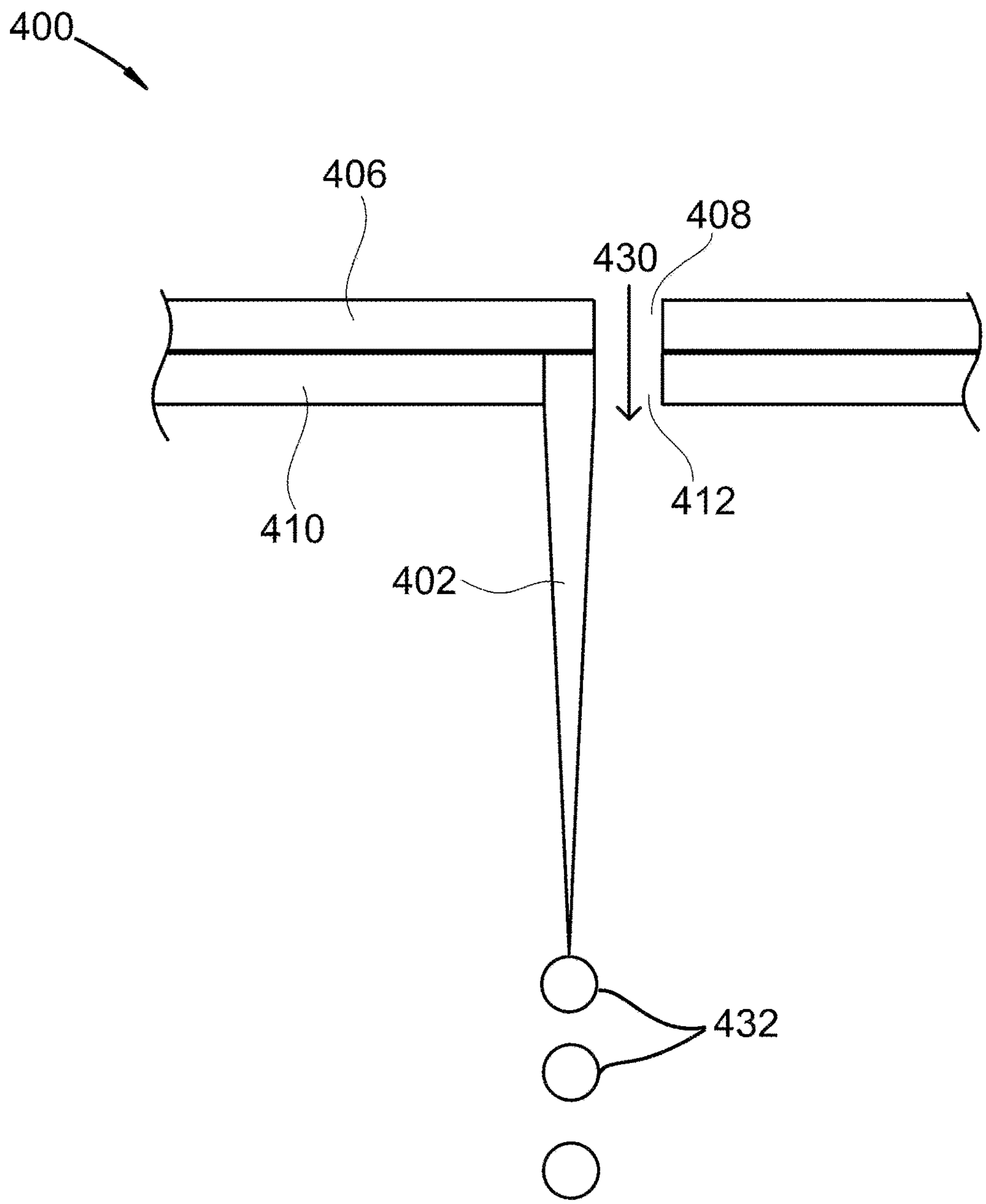
FIG. 4 shows a sideview cross-section of aligned openings in a disk assembly substantially similar to FIG. 1C.

Referring to FIG. 4, a sideview cross-section of aligned openings in a disk assembly substantially similar to FIG. 1C is shown at 400, as per one embodiment of the present invention. The only difference between the openings of FIG. 1C and FIG. 4 is the addition of a needle-shaped protrusion for droplets to pass down and fall from, producing consistently sized droplets. Needle-shaped protrusion 402 is connected to second opening 412 of second plate 410, extending downward. Contact liquid 430 passes through first openings 408 of first plate 406 and second openings 412 of second plate 410 when first openings 408 and second openings 412 are aligned. Contact liquid 430 flows along needle-shaped protrusion 402 and forms drops 432 at the tip. Drop 432 reaches a consistent droplet size and falls. Due to the nature of droplet behavior at tips of needles, drop 432 will fall at the same size each time.

Figure 5:
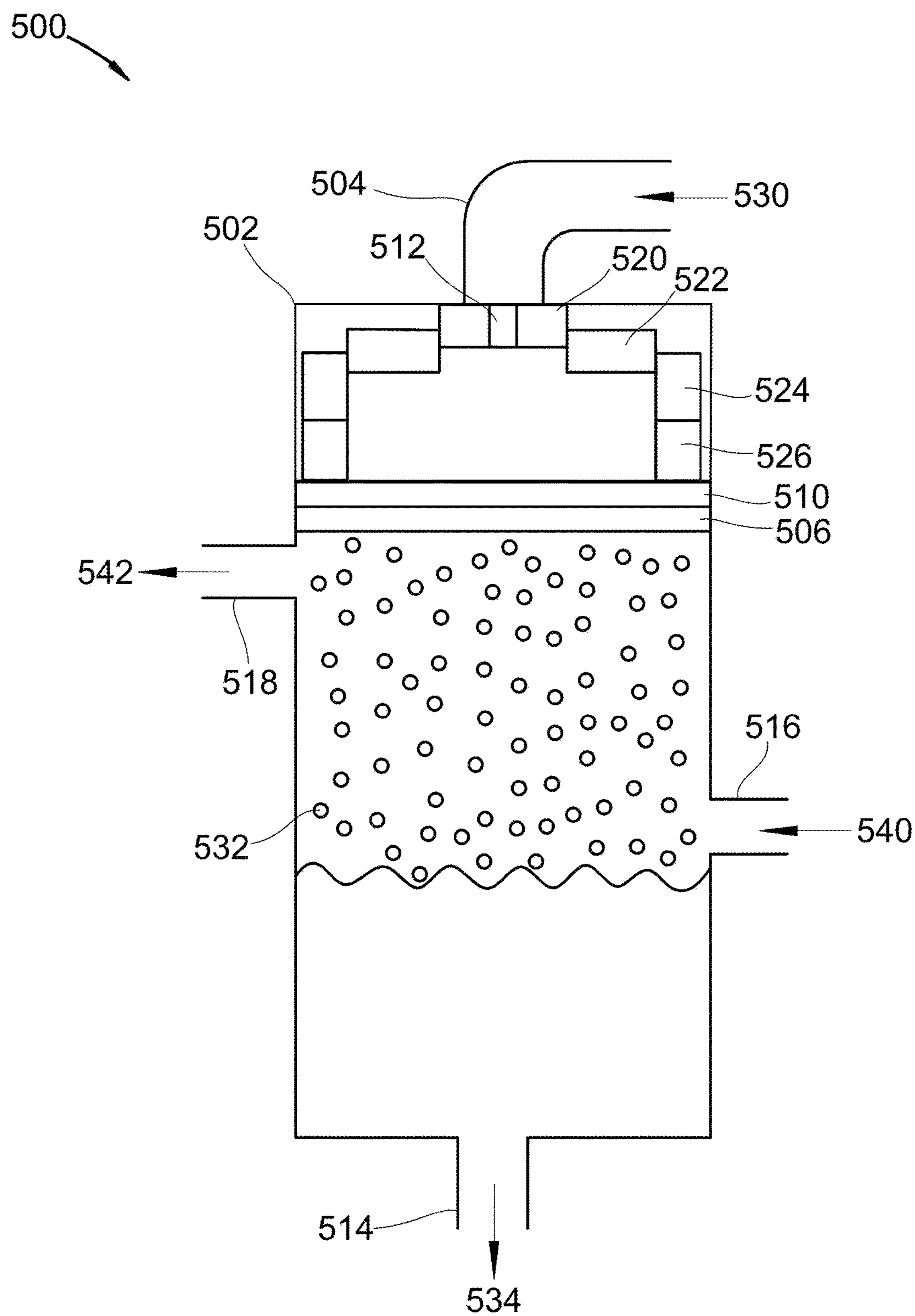
FIG. 5 shows a cross-section of a vessel with a hydraulically driven disk assembly with disks from FIGS. 2A and 2B.

Referring to FIG. 5, a cross-section of a vessel with a hydraulically driven disk assembly with disks from FIGS. 2A and 2B is shown at 500, as per one embodiment of the present invention. Vessel 502 comprises liquid inlet 504, liquid outlet 514, gas inlet 516, gas outlet 518, first disk 506, second disk 510, and seals 520. First disk 506 is stationary. Second disk 510 is rotated by a gear system comprising a sun gear 520, planetary gears 522 and 524, and ring gear 526, driven by turbine 512. Turbine 512 is driven by liquid 530 as liquid 530 is pumped through liquid inlet 504. Carrier gas 540 passes through gas inlet 516. The first openings and the second openings alternately align with one another such that, as contact liquid 530 passes through the first openings and the second openings, contact liquid 530 falls as droplet 532 as the first openings and the second openings skew apart. Droplet 532 falls through carrier gas 540, exchanging heat, material, or heat and material. Carrier gas 542 passes out gas outlet 518 and contact liquid 534 passes out the liquid outlet.

The viscosity of the liquid and the relative rotational velocity of the openings as they cross each other determines the size of droplets. If the velocity is slow, the viscosity is low, or a combination thereof, the droplets will be rivulets. If the velocity is high, the viscosity is high, or a combination thereof, the droplets will be small.

In some embodiments, the first disk and the second disk comprise metals, plastics, ceramics, or combinations thereof.

In some embodiments, the liquid comprises a slurry or a pure liquid. In some embodiments, the liquid comprises a viscosity greater than water. One benefit of this design is the ability to handle highly viscous fluids. In some embodiments, an interior, bottom portion of the first opening, an interior, top portion of the second openings, or a combination thereof, comprise sharpened edges.

In some embodiments, the first disk and the second disk are installed in a vessel. In some embodiments, the vessel comprises a liquid inlet above the first disk, a gas-liquid contacting space, a liquid outlet below the gas-liquid contacting space, a gas inlet above the liquid outlet and below the gas-liquid contacting space, and a gas outlet below the second disk. In some embodiments, the first disk, the second disk, or the first disk and the second disk are caused to rotate by one or more friction drives. In some embodiments, the first disk is caused to rotate by a shaft attached to a center of the first disk. In some embodiments, the second disk is caused to rotate by a driven shaft attached to a center of the second disk. In some embodiments, the first disk is caused to rotate by a driven shaft attached to a center of the first disk and the second disk is caused to rotate by a driven shaft attached to a center of the second disk. In some embodiments, the shafts could be magnetic rotor poles and be driven by electromagnetic coils outside of the vessel.

In some embodiments, the first disk and the second disk are sealed by gaskets or O-rings at inside edges of the vessel.

In some embodiments, the first disk and the second disk comprise identical opening patterns. In some embodiments, the first disk and the second disk comprise identical but mirrored opening patterns. In some embodiments, the first openings are divergent from each other, the second openings are divergent from each other, or a combination thereof. In some embodiments, the first openings are divergent from any line made between a center and an outer edge of the first disk, the second openings are divergent from any line made between a center and an outer edge of the second disk, or a combination thereof. In some embodiments, the first openings are antisymmetric about a center of the first disk, the second openings are antisymmetric about a center of the second disk, or a combination thereof.

In some embodiments, the first disk and the second disk comprise identical thicknesses. In some embodiments, the first disk and the second disk comprise different thicknesses.

We claim:

1. A device for producing droplets comprising:

a disk assembly comprising a first disk mounted to a second disk, the first disk comprising a plurality of first openings, and the second disk comprising a plurality of second openings, wherein the plurality of first openings and the plurality of second openings alternately align with one another such that, as a liquid passes through the plurality of first openings and the plurality of second openings, the liquid falls as a droplet as the plurality of first openings and the plurality of second openings skew apart.

2. The device of claim 1, wherein the first disk and the second disk comprise metals, plastics, ceramics, or combinations thereof.

3. The device of claim 1, wherein an interior, bottom portion of each of the plurality of first openings, an interior, top portion of each of the plurality of second openings, or a combination thereof, comprise sharpened edges.

4. The device of claim 1, wherein the first disk and the second disk are installed in a vessel.

5. The device of claim 4, wherein the vessel comprises:

a liquid inlet above the first disk, a gas-liquid contacting space, a liquid outlet below the gas-liquid contacting space, a gas inlet above the liquid outlet and below the gas-liquid contacting space, and a gas outlet below the second disk.

6. The device of claim 4, further comprising one or more friction drives, wherein one or more friction drives cause the first disk, the second disk, or the first disk and the second disk to rotate.

7. The device of claim 4, further comprising a shaft attached to a center of the first disk, wherein the shaft causes the first disk to rotate.

8. The device of claim 4, further comprising a shaft attached to a center of the second disk, wherein the shaft causes the second disk to rotate.

9. The device of claim 4, further comprising a first shaft attached to a center of the first disk, and, a second shaft attached to a center of the second disk, wherein the first shaft causes the first disk to rotate in a first direction, and, wherein the second shaft causes the second disk to rotate opposite to the first direction.

10. The device of claim 4, further comprising at least two gaskets or at least two O-rings, wherein the at least two gaskets or the at least two O-rings are placed above and below the disk assembly against an inside edge of the vessel.

11. The device of claim 1, wherein the first disk and the second disk comprise identical opening patterns or identical but mirrored opening patterns.

12. The device of claim 1, wherein the first disk is stationary and the second disk is driven by gears that are driven by a turbine that is driven by the fluid passing through the fluid inlet.

13. The device of claim 1, wherein the first openings are divergent from each other, the second openings are divergent from each other, or a combination thereof.

14. The device of claim 1, wherein the first openings are divergent from any line made between a center and an outer edge of the first disk, the second openings are divergent from any line made between a center and an outer edge of the second disk, or a combination thereof.

15. The device of claim 1, wherein the first openings are antisymmetric about a center of the first disk, the second openings are antisymmetric about a center of the second disk, or a combination thereof.

16. The device of claim 1, wherein the first disk and the second disk comprise substantially identical thicknesses or different thicknesses.

17. The device of claim 1, wherein the first disk comprises needle-shaped protrusions attached to an edge of the plurality of first openings.

18. A device for producing droplets comprising:

a disk assembly comprising a first disk mounted to a second disk;

the first disk comprising a plurality of first openings, an interior, bottom portion of each of the plurality of first openings comprising sharpened edges;

the second disk comprising a plurality of second openings, an interior, bottom portion of each of the plurality of second openings comprising sharpened edges;

wherein the first disk and the second disk are installed in a vessel, the vessel comprising:

a liquid inlet above the first disk;

a liquid outlet in a bottom portion of the vessel;

a gas inlet above the liquid outlet; and a gas outlet below the second disk;

wherein, a contact liquid passes through the liquid inlet and a carrier gas passes through the gas inlet;

wherein the first openings and the second openings alternately align with one another such that, as the contact liquid passes through the first openings and the second openings, the contact liquid falls as a droplet as the first openings and the second openings skew apart;

wherein the droplet falls through the carrier gas, exchanging heat, material, or heat and material; and, wherein the carrier gas passes out the gas outlet and the contact liquid passes out the liquid outlet.

* * * * *